June 20, 1933. E. S. MacPHERSON 1,914,517
AUXILIARY STARTING MEANS FOR MOTOR VEHICLES
Filed April 11, 1932 2 Sheets-Sheet 1
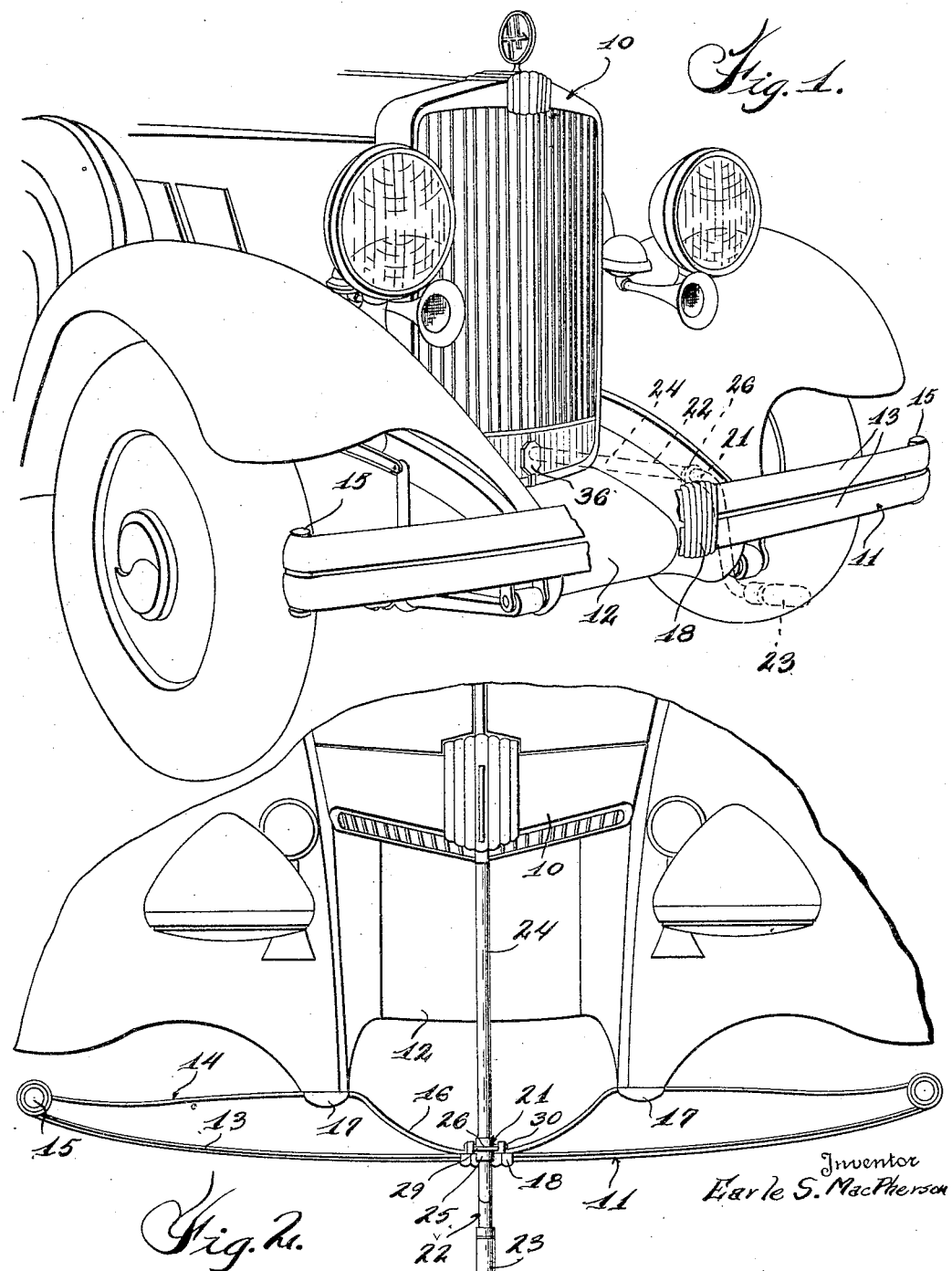

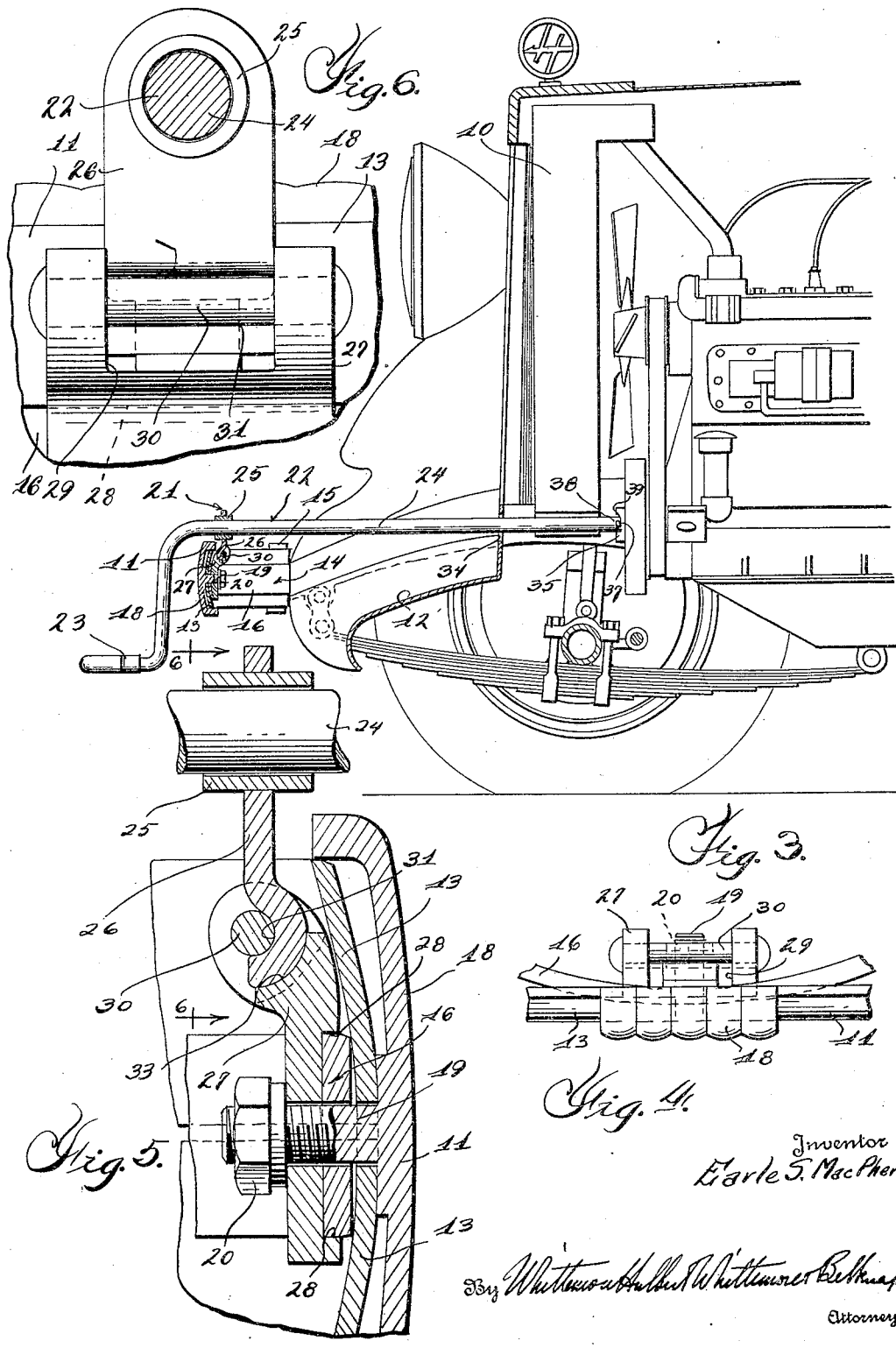

Patented June 20, 1933

1,914,517

UNITED STATES PATENT OFFICE

EARLE S. MacPHERSON, OF DETROIT, MICHIGAN, ASSIGNOR TO HUPP MOTOR CAR CORPORATION, OF DETROIT, MICHIGAN, A CORPORATION OF VIRGINIA

AUXILIARY STARTING MEANS FOR MOTOR VEHICLES

Application filed April 11, 1932. Serial No. 604,601.

This invention relates generally to motor vehicles of the type propelled by internal combustion engines and refers more particularly to improvements in the manually operable starting means usually provided for starting the engines in cases of emergency.

It is customary in the manufacture of motor vehicles to provide auxiliary manually operable means for starting the engine upon failure of the automatic mechanism usually provided for this purpose. The aforesaid auxiliary starting means generally comprises a crank having a handle at one end and having means at the opposite end fashioned to extend into a suitable ratchet operatively connected to the forward end of the crank shaft of the engine for interlocking engagement therewith. In a great many vehicles as now commercially produced, the ratchet forms the only support for the crank with the result that the length of the latter is limited to such an extent as to render the same impractical for use in connection with vehicles having front end constructions necessitating the provision of a crank of sufficient length to permit manipulating the same from a position in advance of the front bumpers of the vehicle.

It is therefore one of the principal objects of the present invention to provide a crank assembly having means for adequately supporting a crank of sufficient length in operative relation to the engine to permit convenient manipulation of the same from a position beyond the front bumper of the vehicle.

A further advantageous feature of this invention resides in the provision of a crank assembly having a crank, together with means permanently slidably mounted upon the shank of the crank in the form of a bearing support fashioned to be readily attached to and removed from a fixed part of the vehicle.

A still further object of the present invention consists in the provision of a bracket permanently secured to the front bumper of a vehicle by the means ordinarily employed for securing the several parts of the bumper in assembled relation and having a portion co-operating with the bearing support aforesaid to secure the latter in place.

With the foregoing as well as other objects in view, the invention consists in the provision of a relatively simple and inexpensve crank assembly capable of being readily attached to and removed from the vehicle without the necessity of manipulating any fastening devices.

In the drawings:

Figure 1 is a perspective view illustrating the front end of a motor vehicle for which my improved crank assembly is especially designed;

Figure 2 is a top plan view of the construction shown in Figure 1;

Figure 3 is a fragmentary longitudinal sectional view through the construction shown in Figure 1;

Figure 4 is a detail view of the front bumper bracket;

Figure 5 is an enlarged fragmentary sectional view illustrating the supporting means for the crank;

Figure 6 is a sectional view taken substantially on the line 6—6 of Figure 5.

Referring now more in detail to the drawings, it will be noted that there is illustrated in Figure 1 a motor vehicle front end construction comprising in general a heat exchange or radiator unit 10, a front bumper assembly 11 positioned in advance of the radiator unit in accordance with the usual practice and a body apron 12 extending forwardly from the lower end of the radiator to a position in proximity to the front bumper assembly 11. The bumper assembly 11 shown herein for the purpose of illustration comprises vertically spaced impact bars 13 extending transversely of the vehicle in advance of the front end thereof and secured to the same by a spring bar 14 positioned in rear of the impact bars with the major portions thereof spaced from the latter. The opposite ends of the spring bar 14 are suitably secured to the adjacent ends of the impact bars by pins 15 and the central portions 16 thereof are bowed forwardly into engagement with the rear sides of the impact bars. The spring bar 14 is detachably secured to the front ends of the frame sills on opposite sides of the bowed portion aforesaid thereof by means of suitable caps 17, and the latter portion is secured to the impact bars by an ornamental cap 18. The cap 18 engages the front sides of the impact bars and is provided with a threaded stud 19 extending rearwardly between the impact bars through the bowed portion of the spring bar for receiving a clamping nut 20.

As shown particularly in Figure 2, the space between the front edge of the body apron 12 and bumper assembly 13 is insufficient to provide for convenient manipulation of a crank handle therein, and, accordingly, necessitates the provision of a crank of sufficient length to locate the handle thereof forwardly beyond the bumper assembly when the same is operatively connected to the engine. The provision of a crank of the required length to accomplish the foregoing renders it difficult to provide an adequate support for the crank and at the same time permit the latter to be readily assembled with and removed from the vehicle. The foregoing is accomplished herein by providing a crank assembly 21 comprising a crank 22 having a handle portion 23 at one end thereof and having a shank 24 of a length determined in accordance with the distance between the forward end of the crank shaft of the engine and front bumper so as to permit the handle 23 of the crank to assume a position forwardly beyond the bumper in the assembled position of the shank with the engine. Permanently mounted upon the shank of the crank for sliding movement relative thereto is a bearing 25 fixed in a suitable plate 26 having the lower end thereof fashioned for attachment to a bracket 27 carried by the bumper assembly. In detail, the bracket 27 is located in rear of the impact bars 13 so as to be substantially concealed from view and is permanently secured thereto by the stud 19 on the ornamental cap 18. As shown particularly in Figure 5, rotation of the bracket 27 relative to the bumper is prevented by means of vertically spaced shoulders 28 formed on the bracket 27 by recessing the front face thereof and engageable with the upper and lower edges of the spring bar 16 aforesaid of the bumper. The upper end of the bracket 27 is bifurcated as at 29 for receiving the lower end of the plate 26 and a suitable pin 30 is extended between the furcations with the opposite ends secured to the latter. The lower end aforesaid of the plate is offset forwardly relative to the body portion of the bracket and is fashioned to form a rearwardly opening semi-circular bearing 31 having a radius corresponding to the radius of the pin 30 for receiving the latter. The external surface of the semi-circular bearing 31 is also struck from the center of the pin engaging surface aforesaid thereof and in the position shown in Figure 5 seats upon the correspondingly curved bearing surface 33 formed on the bracket between the furcations. The arrangement is such that the pin 30 serves to maintain the plate in assembled relation to the bracket and the latter functions to take the downward thrusts imparted to the crank during operation of the same.

In use, the semi-circular bearing 31 on the lower end of the plate is hooked over the pin 30 and rotated about the axis of the latter until the plate assumes the position thereof shown in Figure 5 wherein one side of the bearing 31 engages the pin and the opposite side thereof engages the bearing surface 33 on the bracket 27. The crank 22 is then slid rearwardly relative to the plate 26 to extend the rear end thereof through an opening 34 in the radiator unit 10 and to operatively connect the latter end of the crank with a ratchet 35 fixed on the forward end of the engine crank shaft. Inasmuch as the opening 34 is normally concealed by a suitable closure 36, it will be understood that the latter must be removed prior to extending the crank through the opening.

The ratchet 35 is of conventional design having an axially extending opening therein for receiving the rear end portion of the crank and having diametrically opposed shoulders 37 engageable with opposite ends of a suitable pin 38 extending transversely through the crank. The shoulders 37 are so arranged as to provide for rotation of the crank shaft of the engine in the desired direction by the crank, and cam surfaces 39 are provided on the ratchet inclined in a direction to automatically throw the crank out of engagement with the ratchet as soon as the engine is started.

Thus, from the foregoing it will be seen that I have provided a relatively simple and inexpensive crank assembly particularly applicable for use in association with vehicles wherein the front end construction is such as to necessitate the provision of a relatively long crank. It will further be apparent from the previous description that the novel crank assembly illustrated herein is capable of being readily assembled with and removed from the vehicle without the necessity of employing wrenches for manipulating fastening devices.

What I claim as my invention is:

1. A starting crank assembly for motor vehicles having internal combustion engines, comprising a crank having a relatively long shank portion fashioned at the inner end thereof for operative connection with the engine and having a portion at the outer end providing a grip, and a journal permanently mounted upon the shank of said crank and having a portion attachable to a fixed part of the vehicle in a position to support the crank adjacent the grip during operation of the same.

2. A starting crank assembly for motor vehicles having internal combustion engines, comprising a crank having a shank provided with a portion at the inner end fashioned to detachably engage a crank shaft and having a grip at the outer end, and means forming a unit with said crank for supporting the latter adjacent the grip during operation of the same including a journal slidably and rotatably mounted on said shank and having a portion detachably engageable with a fixed part of a vehicle.

3. The combination with a motor vehicle comprising an internal combustion engine having a crank shaft and a bumper at the front end thereof, of a starting crank assembly for said engine comprising, a crank having a shank portion fashioned at the inner end thereof for attachment to said crank shaft and having a gripping portion at the outer end, said crank being of sufficient length to locate the gripping portion beyond the bumper of the vehicle when the shank portion thereof is in assembled relation with the crank shaft, and means for supporting the crank from the bumper aforesaid during operation of said crank to start the engine.

4. The combination with a motor vehicle comprising an internal combustion engine having a crank shaft and a bumper at the front end thereof, of a starting crank assembly for said engine comprising, a crank having a shank portion fashioned at the inner end thereof for attachment to said crank shaft and having a gripping portion at the outer end, said crank being of sufficient length to locate the gripping portion beyond the bumper of the vehicle when the shank portion thereof is in assembled relation with the crank shaft, and a journal forming a unit with said crank and attachable to the front bumper of the vehicle for supporting said crank adjacent the gripping portion thereof during operation of the same to start said engine.

5. The combination with a motor vehicle comprising an internal combustion engine provided with a crank shaft, a radiator unit in advance of the engine, a front bumper and a body apron extending forwardly from said radiator unit to a position adjacent said bumper, of a starting crank assembly comprising a crank having a shank provided with a portion at the inner end thereof insertable through an opening in the radiator unit for attachment to said crank shaft and having a gripping portion at the outer end, said crank being of sufficient length to locate the gripping portion beyond the bumper when the inner end thereof is in assembled relation with the crank shaft, and means carried by said crank and attachable to said bumper for supporting the crank adjacent the gripping portion thereof during operation of the same to start said engine.

6. The combination with a motor vehicle comprising an internal combustion engine having a crank shaft and a bumper at the front end thereof, of a starting crank assembly for said engine comprising, a crank having a shank portion fashioned at the inner end thereof for attachment to said crank shaft and having a gripping portion at the outer end, said crank being of sufficient length to locate the gripping portion beyond the bumper of the vehicle when the shank portion thereof is in assembled relation with the crank shaft, and a journal carried by said crank and having a portion fashioned for interlocking engagement with a part carried by said bumper for supporting the crank from the bumper during operation of the former to start said engine.

7. The combination with a motor vehicle comprising an internal combustion engine having a crank shaft and a bumper at the front end thereof, of a starting crank assembly for said engine comprising, a crank having a shank portion fashioned at the inner end thereof for attachment to said crank shaft and having a gripping portion at the outer end, said crank being of sufficient length to locate the gripping portion beyond the bumper of the vehicle when the shank portion thereof is in assembled relation with the crank shaft, and a member having a portion slidably and rotatably mounted upon the shank of said crank and having another portion fashioned to slip over a part carried by the bumper for supporting the crank from the bumper during operation of the former to start said engine.

8. The combination with a motor vehicle comprising an internal combustion engine provided with a crank shaft and a bumper at the front end of the vehicle, of auxiliary starting means for the engine comprising a bracket secured to said bumper and having a transverse anchorage portion, a starting crank having a shank fashioned at the inner end for attachment to the crank shaft of the engine and having a gripping portion at the outer end thereof, said crank being of sufficient length to locate the gripping portion beyond the bumper when the shank portion thereof is in operative relation to the crank shaft, and a journal carried by said crank having a portion fashioned to slip over the anchorage portion for supporting the crank from the bumper during operation thereof to start the engine.

9. The combination with a motor vehicle comprising an internal combustion engine provided with a crank shaft and a bumper at the front end of the vehicle having impact bars and a spring bar, of auxiliary means for starting the engine comprising, a bracket having spaced shoulders engaging opposite edges of said spring bar, means for clamping said bracket to the spring bar, a starting crank having a shank fashioned at the inner end for attachment to the crank shaft of the engine and having a gripping portion at the outer end thereof, said crank being of sufficient length to locate the gripping portion beyond the bumper when the shank portion thereof is in operative relation to the crank shaft, and a journal carried by said crank having a portion fashioned for attachment to said bracket for supporting the crank during operation of the same to start said engine.

10. The combination with a motor vehicle comprising an internal combustion engine provided with a crank shaft, a bumper at the front end of the vehicle having impact bars and a spring bar, and a member embracing the impact bars and having a stud projecting rearwardly through an opening in the spring bar fashioned to receive a clamping nut for securing said bars together, of auxiliary means for starting the engine comprising, a bracket clamped to said spring bar by the stud and nut aforesaid and having spaced shoulders engaging opposite side edges of the spring bar, a starting crank having a shank fashioned at the inner end for attachment to the crank shaft of the engine and having a gripping portion at the outer end thereof, said crank being of sufficient length to locate the gripping portion beyond the bumper when the shank portion thereof is in operative relation to the crank shaft, and a journal carried by said crank having a portion fashioned for attachment to said bracket for supporting the crank during operation of the same to start said engine.

11. The combination with a motor vehicle having a bumper extending transversely of the vehicle at the front end thereof and comprising a spring bar and an impact bar positioned to one side of the spring bar, of a bracket member located upon the opposite side of the spring bar and having a portion for supporting a starting crank assembly, and common means for clamping the impact bar, spring bar and bracket member together as a unit.

12. The combination with a motor vehicle having an internal combustion engine and having a bumper extending transversely thereof in advance of the internal combustion engine, of a bracket member secured to the bumper and having a portion for supporting a starting crank assembly in operative relation to the engine.

13. The combination with a motor vehicle having an internal combustion engine, a radiator unit in advance of the engine and an apron extending forwardly from the radiator unit, of auxiliary means for starting the engine including a crank having a portion at the inner end fashioned for attachment to the crank shaft of the engine and having a gripping portion at the outer end, said crank being of sufficient length to locate the gripping portion forwardly beyond the front edge of the body apron when the portion aforesaid is in assembled relation with the crank shaft, a journal forming a unit with said crank, and means for removably supporting the journal in a position forwardly of the body apron.

In testimony whereof I affix my signature.

EARLE S. MacPHERSON.